United States Patent
Scorsiroli

[11] Patent Number: 5,661,871
[45] Date of Patent: Sep. 2, 1997

[54] WINDSHIELD WIPER BLADE WITH REINFORCING CORE

[75] Inventor: Marcello Scorsiroli, Turin, Italy

[73] Assignee: Cooper Industries, Inc., Houston, Tex.

[21] Appl. No.: 671,963

[22] Filed: Jun. 28, 1996

[30] Foreign Application Priority Data

Jul. 6, 1995 [IT] Italy .................. T0950157 U

[51] Int. Cl.⁶ .................................................. B60S 1/38
[52] U.S. Cl. .................. 15/250.452; 15/250.48; 15/250.451
[58] Field of Search ............... 15/250.451, 250.452, 15/250.07, 250.48, 250.453, 250.454, 250.46, 250.47

[56] References Cited

U.S. PATENT DOCUMENTS

| | | | |
|---|---|---|---|
| 3,099,031 | 7/1963 | Ludwig | 15/240.42 |
| 3,107,384 | 10/1963 | Wise | 15/250.453 |
| 3,177,514 | 4/1965 | Wise | 15/250.453 |
| 3,427,637 | 2/1969 | Quinlan et al. | 15/250.451 |
| 4,587,686 | 5/1986 | Thompson | 15/250.48 |
| 4,796,326 | 1/1989 | Beneteau et al. | 15/250.453 |
| 4,930,180 | 6/1990 | Longman | 15/250.42 |
| 5,231,730 | 8/1993 | Schmid et al. | 15/250.453 |

FOREIGN PATENT DOCUMENTS

| | | | |
|---|---|---|---|
| 0455480 | 11/1991 | European Pat. Off. . | |
| 2199302 | 4/1974 | France . | |
| 1116090 | 10/1961 | Germany | 15/250.48 |
| 1952855 | 4/1971 | Germany | 15/250.48 |
| 2843164 | 4/1979 | Germany | 15/250.48 |
| 4320637 | 1/1995 | Germany . | |
| 1322277 | 7/1973 | United Kingdom | 15/250.451 |
| 2202134 | 9/1988 | United Kingdom | 15/250.48 |

*Primary Examiner*—Gary K. Graham
*Attorney, Agent, or Firm*—Fish & Richardson P.C.

[57] ABSTRACT

A windshield wiper blade for vehicles includes a wiper element, a wiper holder having a longitudinal seat restraining a base portion of the wiper element and having a longitudinal cavity in which a metal reinforcing core is disposed, and an arcuate support structure with restraining jaws which grip the wiper holder at predetermined points.

5 Claims, 4 Drawing Sheets

WINDSHIELD WIPER BLADE WITH REINFORCING CORE

BACKGROUND OF THE INVENTION

The invention relates to a windshield wiper blade for a vehicle.

Windshield wiper blades often include a wiper element having a lip that contacts the windshield of a vehicle and a base portion that supports the lip. A wiper holder attaches to the base portion and is connected to a wiper arm that moves the wiper blade across the windshield.

SUMMARY OF THE INVENTION

The invention features a windshield wiper blade that includes a plastic wiper holder having a longitudinal seat that restrains the base portion of the wiper element and a longitudinal cavity in which a metal reinforcing core is disposed. The blade also includes an arcuate support structure with restraining jaws that grip the wiper holder at predetermined points.

The wiper holder provides a connection between the support structure and the wiper element. The wiper holder also provides the wiper element with sufficient longitudinal curvature and resilience to enable the lip of the wiper to remain in contact with a curved windshield as the lip moves along the windshield.

The wiper holder may be produced using a highly efficient extrusion process. This means that blades with plastic wiper holders are generally less expensive than those in which the blade has a pair of metal reinforcing plates to achieve the necessary shape and resilience.

In use, a connector arm exerts a strong force that presses the wiper element against the windshield. When the wiper holder is made from plastic and is heated by exposure to the sun, the wiper holder may lose its original shape. When this occurs, the wiper's lip may no longer follow the curvature of the windshield. The wiper blade of the present invention includes a metal reinforcing core in the wiper holder to overcome this problem.

In one aspect, generally, the invention features a windshield wiper blade for vehicles. The wiper blade includes a wiper element having a lip and a base portion. The wiper blade also includes a wiper holder having a longitudinal seat that restrains the base portion of the wiper element. The wiper holder has a longitudinal cavity in which a metal reinforcing core is disposed.

Embodiments of the invention may include one or more of the following features. The wiper blade may include an arcuate support structure with restraining jaws that grip the wiper holder at predetermined points. The wiper holder may have longitudinal lateral grooves that are engaged by the jaws of the support structure. Moreover, at least one set of jaws of the support structure may exert on the wiper holder a clamping force that also clamps the wiper element and/or the reinforcing plate.

The wiper holder also may include a pair of holes adjacent to at least one set of jaws, and the set of jaws may pass through the holes to grip the wiper element and/or the reinforcing plate directly. The reinforcing plate also may include a pair of notches for engagement by the jaws.

Other features and advantages will become apparent from the following description, including the drawings, and from the claims.

DESCRIPTION OF THE PREFERRED EMBODIMENTS

Figure 1:
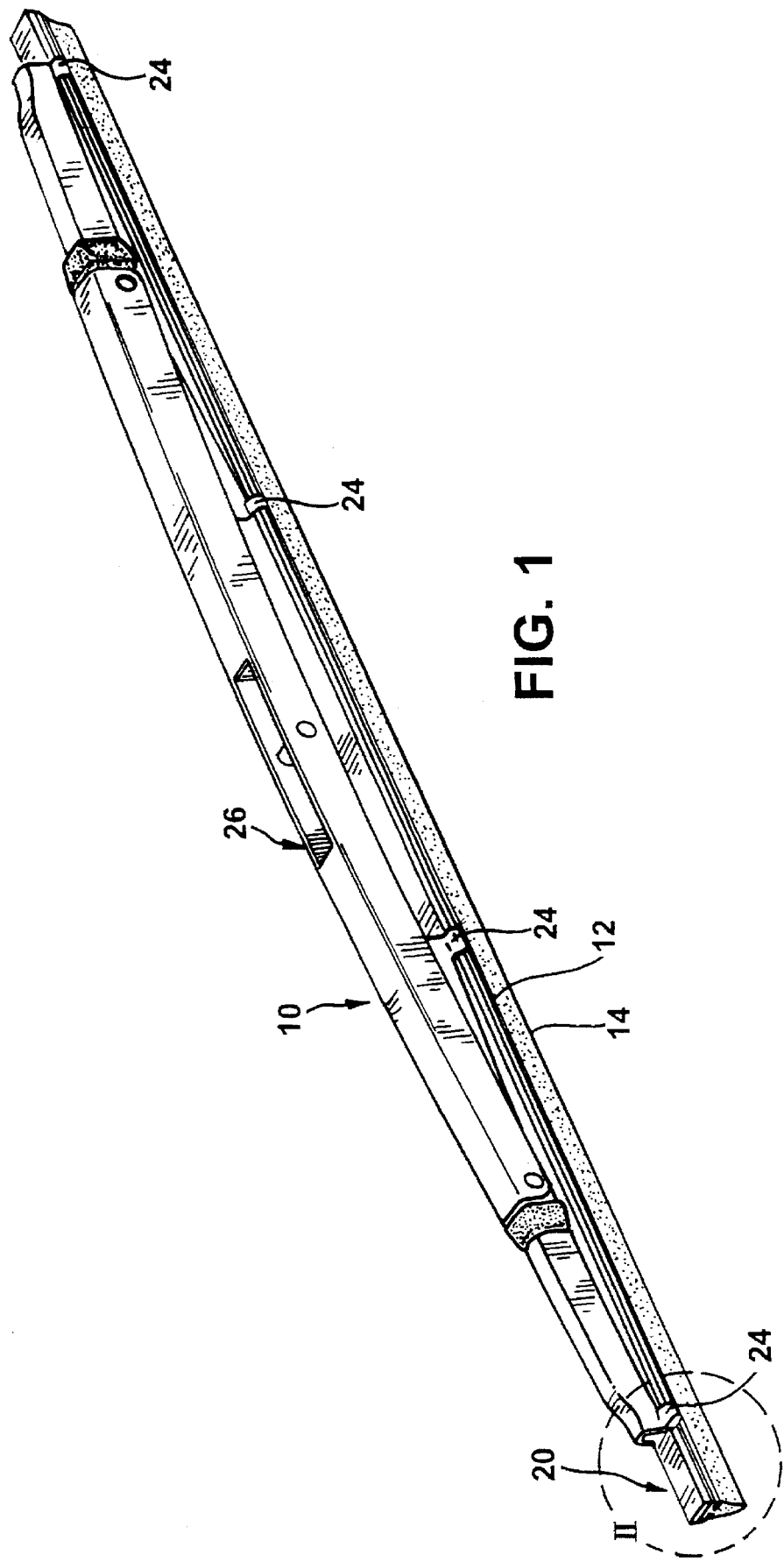
FIG. 1 is a perspective view of a windshield wiper blade.
Figure 3:
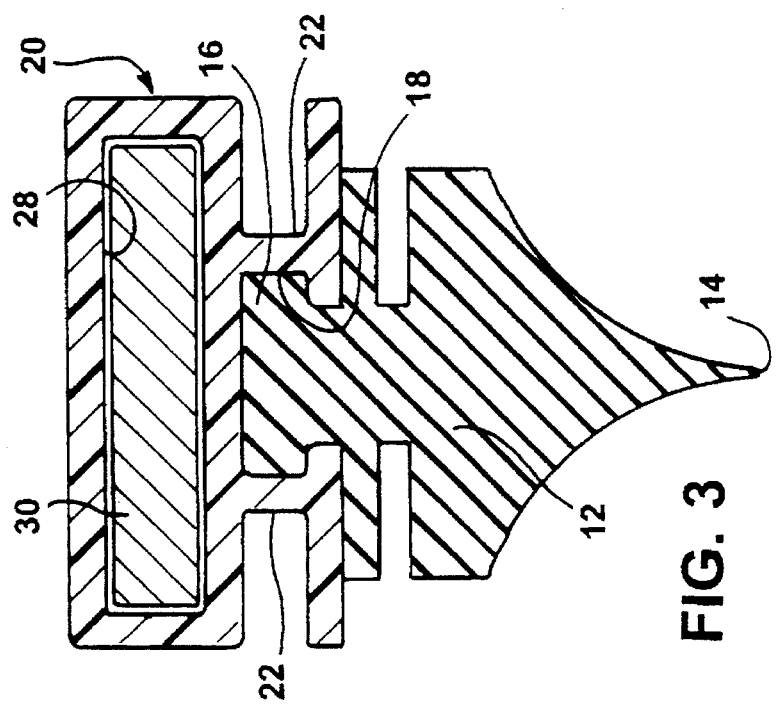
FIG. 3 is a sectional view taken along section III—III of FIG. 2.
Figure 2:
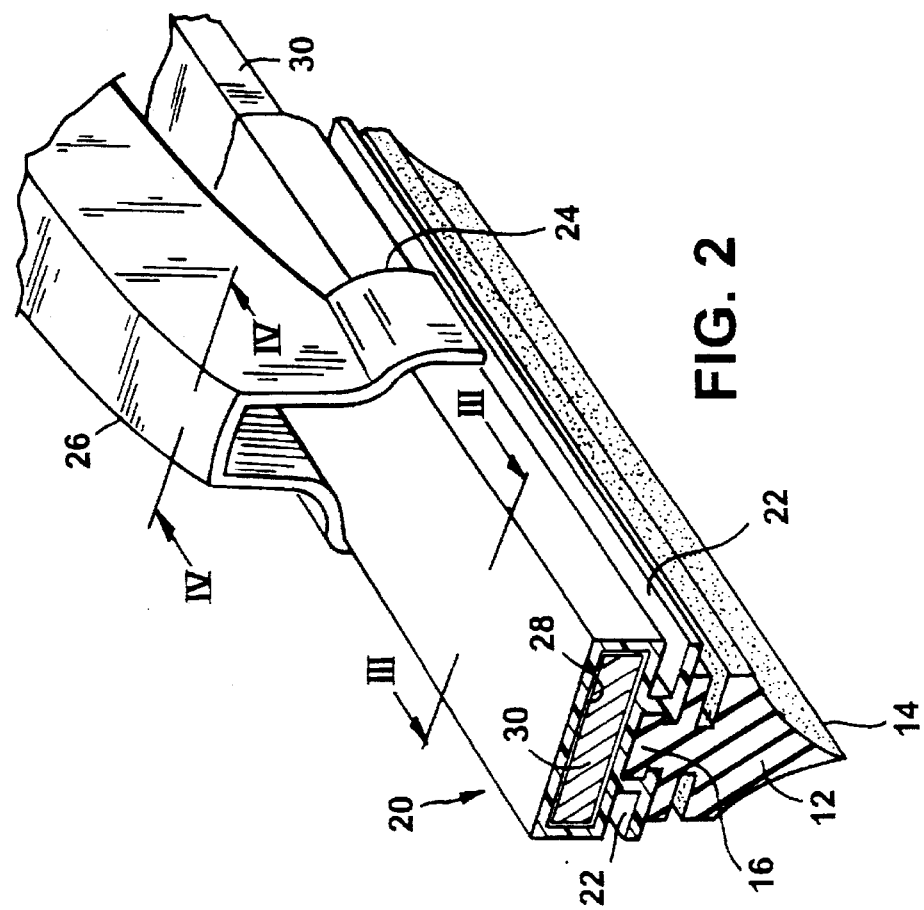
FIG. 2 is an enlarged perspective view of the portion of the windshield wiper blade of FIG. 1 indicated by the arrow II.

Referring to FIGS. 1–3, a windshield wiper blade 10 includes a wiper element 12 that is made from elastomeric material. The wiper element 12 has a lip 14 that may be pressed with a predetermined load against a windshield surface. The wiper element 12 also has a base portion 16 that is inserted in a groove 18 in a plastic wiper holder 20. The groove 18 has an undercut cross section and is substantially the same length as the wiper element 12. The wiper holder 20 includes two longitudinal lateral grooves 22. The grooves 22 are engaged by restraining jaws 24 of a generally arcuate support structure 26.

The wiper holder 20 includes a longitudinal cavity 28 that houses a metal reinforcing plate 30. The metal plate 30 may be made, for example, from stainless steel or untreated spring steel. Longitudinally, the plate 30 may be straight or may be shaped to match the curvature of the windshield for which the blade is intended. The plate 30 provides the wiper element 12 and the wiper holder 20 with needed resilience and ensures that the resiliency and shape of the wiper holder at rest remain unchanged even when faced with working pressure and exposure to the sun.

In comparison with a blade that has lateral stiffening plates instead of a plastic wiper holders, the blade 10 is substantially less expensive because the plastic wiper holder is easier to construct and less expensive to produce. Due to the metal reinforcing core, the blade 10 maintains its shape and resilience for long periods of time, this extends the life of the blade 10 relative to blades that include a plastic wiper holder without a metal reinforcing core.

One set of jaws 24 of the support structure 26 is clamped onto the wiper holder 20 to restrain the wiper holder 20 relative to the support structure 26 in a longitudinal direction. The remaining sets of jaws 24 engage the groove 22 of the wiper holder 20 to allow the wiper holder 20 to slide longitudinally through the support structure.

Figure 4:
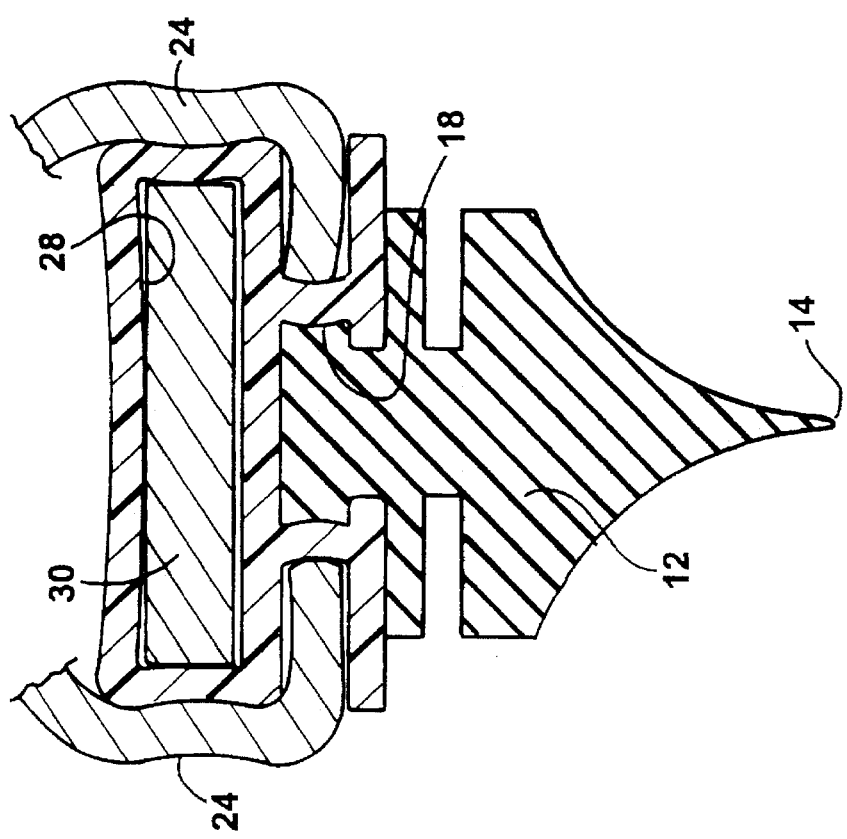
FIG. 4 is a sectional view taken along section IV—IV of FIG. 2 and showing a first longitudinal restraint system.

As shown in FIG. 4, deformation of the set of jaws 24 that are clamped against the wiper holder 20 also clamps the metal reinforcing plate 30 and the wiper element 12 by compressing the walls of the wiper holder 20. This prevents the reinforcing plate 30 and the wiper element 12 from moving longitudinally relative to the wiper holder.

Figure 6:
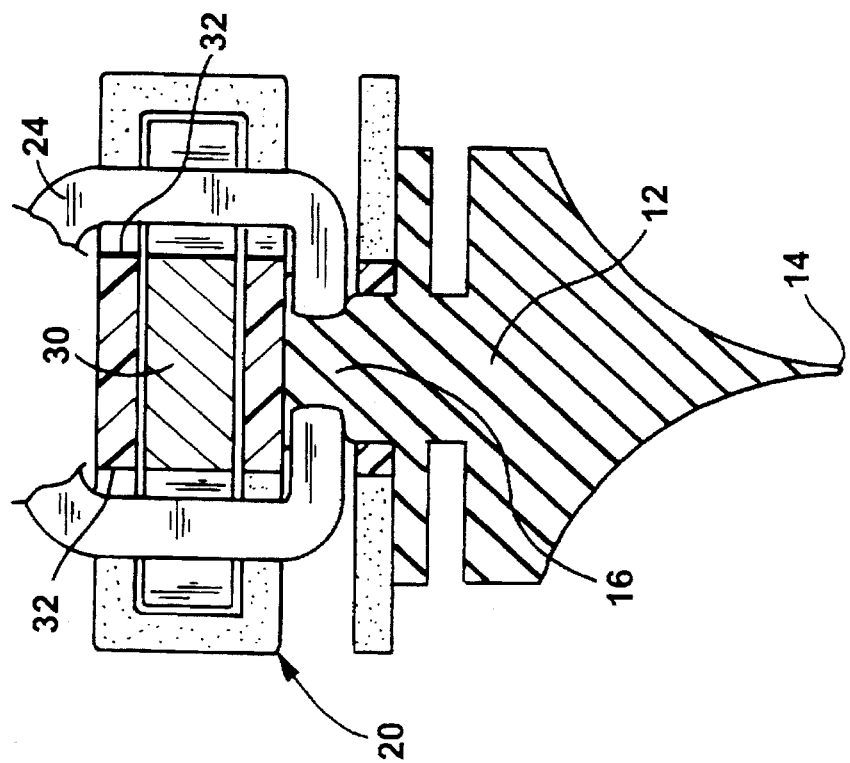
FIG. 6 is a sectional view taken along section VI—VI of FIG. 5.
Figure 5:
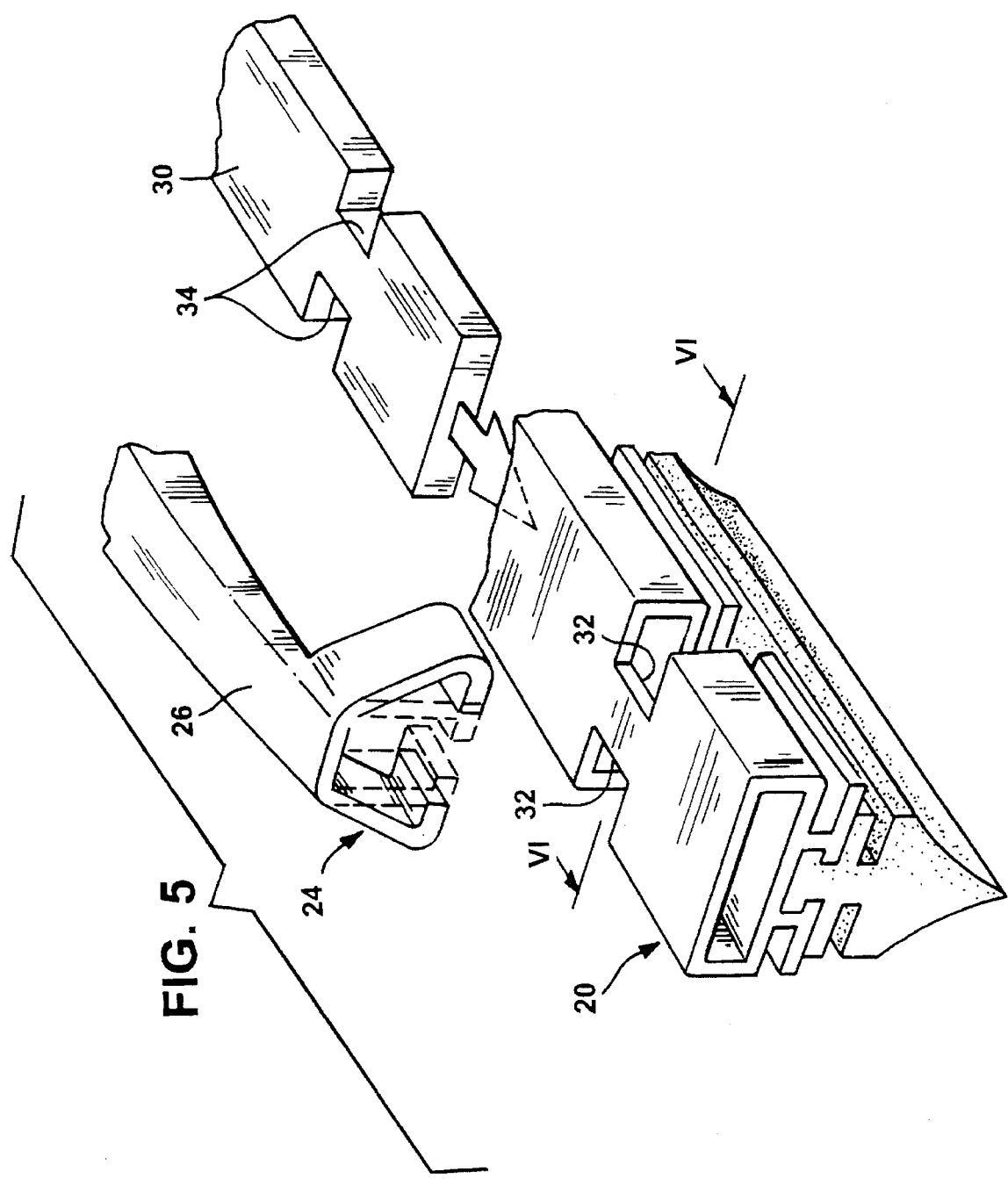
FIG. 5 is a perspective view of an alternative longitudinal restraint system.

Alternatively, as shown in FIGS. 5 and 6, the wiper holder 20 may have a pair of holes 32 disposed adjacent to the jaws 24 that clamp the wiper unit longitudinally. The holes 32 may be produced by blanking when the wiper holder 20 is produced. The metal reinforcing plate 30 has a pair of notches 34 disposed adjacent to the holes 32. As shown in FIG. 6, the jaws 24 thus restrain the reinforcing plate 30 by being positioned in the notches 34 through the holes 32 of the wiper holder 20. The holes 32 may extend as far as the base portion 15 of the wiper element so that the ends of the jaws 24 compress the base portion 16 directly.

Other embodiments are within the scope of the following claims.

What is claimed is:

1. A windshield wiper blade for vehicles, comprising:

a wiper element having a lip and a base portion;

a wiper holder having a longitudinal groove that receives and restrains the base portion of said wiper element and which has a longitudinal cavity;

a metal reinforcing core disposed in the longitudinal cavity; and an arcuate support structure with restraining jaws that grip the wiper holder at predetermined points, wherein the wiper holder has two longitudinal lateral grooves that are engaged by restraining jaws of the support structure, and wherein at least two restraining jaws of the support structure exert on the wiper holder a clamping force which deforms the holder such that the holder also clamps the wiper element.

2. A windshield wiper blade for vehicles, comprising:

a wiper element having a lip and a base portion;

a wiper holder having a longitudinal groove that receives and restrains the base portion of said wiper element and which has a longitudinal cavity;

a metal reinforcing core disposed in the longitudinal cavity; and an arcuate support structure with restraining jaws that grip the wiper holder at predetermined points, wherein the wiper holder has two longitudinal lateral grooves that are engaged by restraining laws of the support structure, and wherein at least two restraining jaws of the support structure exert on the wiper holder a clamping force which deforms the holder such that the holder also clamps the reinforcing core.

3. A windshield wiper blade for vehicles, comprising:

a wiper element having a lip and a base portion;

a wiper holder having a longitudinal groove that receives and restrains the base portion of said wiper element and which has a longitudinal cavity;

a metal reinforcing core disposed in the longitudinal cavity; and an arcuate support structure with restraining jaws that grid the wiper holder at predetermined points, wherein the wiper holder has two longitudinal lateral grooves that are engaged by restraining jaws of the support structure, and wherein the wiper holder includes a pair of holes within the lateral grooves and adjacent to two restraining jaws, and wherein the two restraining jaws are received into the holes to permit the two restraining jaws to grip the wiper element directly.

4. A windshield wiper blade for vehicles, comprising:

a wiper element having a lip and a base portion;

a wiper holder having a longitudinal groove that receives and restrains the base portion of said wiper element and which has a longitudinal cavity;

a metal reinforcing core disposed in the longitudinal cavity; and an arcuate support structure with restraining jaws that grip the wiper holder at predetermined points, wherein the wiper holder has two longitudinal lateral grooves that are engaged by restraining jaws of the support structure, and wherein the wiper holder includes a pair of holes within the lateral grooves and adjacent to two restraining jaws, and wherein the two restraining jaws are received into the holes to permit the two restraining jaws to grip the reinforcing core directly.

5. The wiper blade of claim 4, wherein said reinforcing core includes a pair of notches for engagement by said jaws.

* * * * *